2 Sheets—Sheet 1.

J. IVES.
ANNEALING FURNACE FOR METALS.

No. 188,143. Patented March 6, 1877.

Witnesses:
J. P. Theodore Lang.
James Martin Jr.

Inventor:
James Ives
by
Masm. Fenwick Laurence

N. PETERS, PHOTO-LITHOGRAPHER, WASHINGTON, D.C.

2 Sheets—Sheet 2.
J. IVES.
ANNEALING FURNACE FOR METALS.
No. 188,143. Patented March 6, 1877.
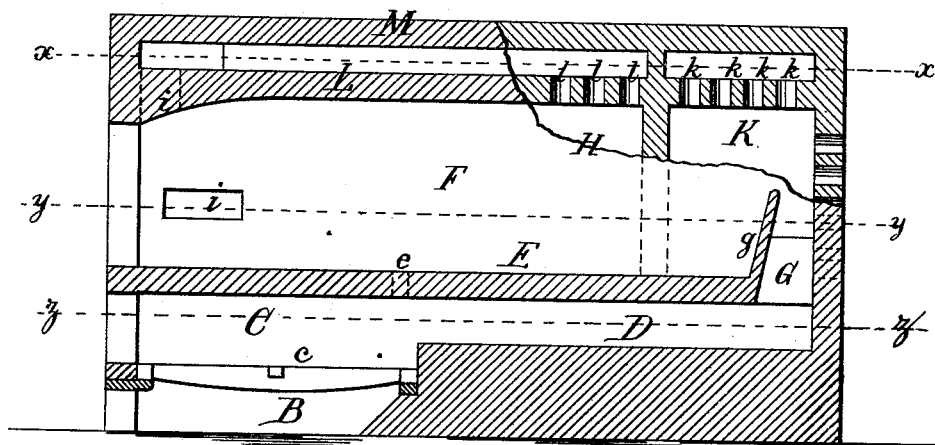
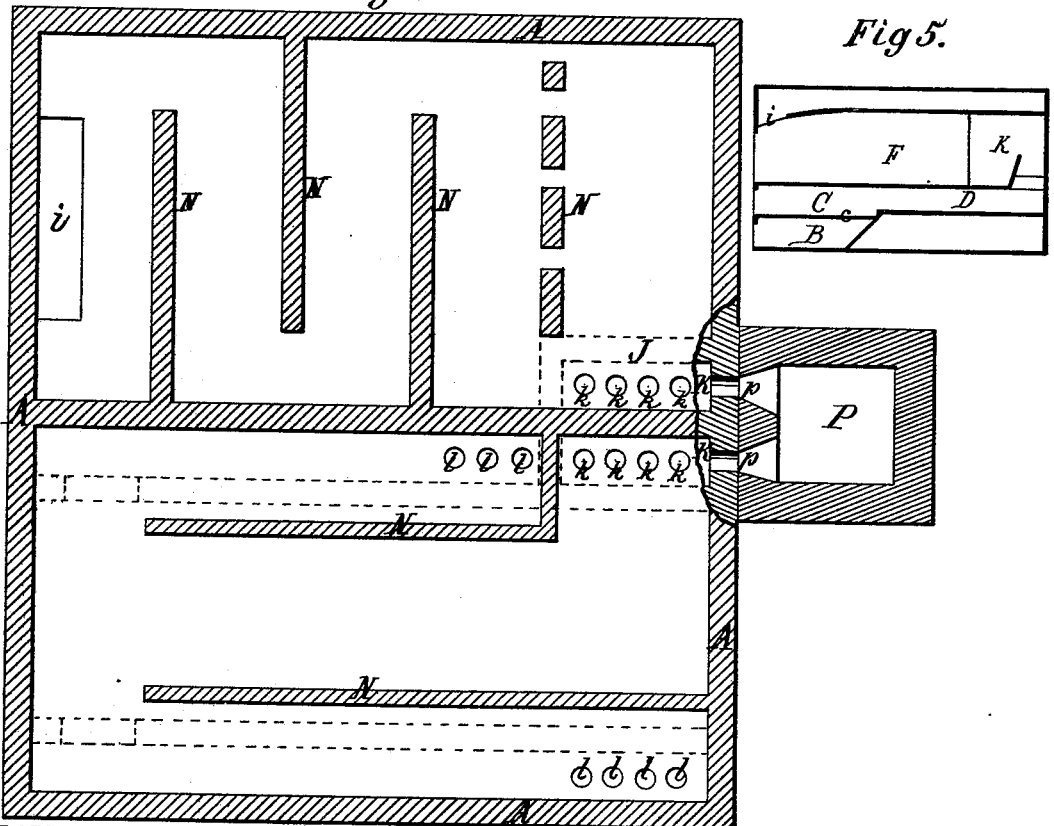
Witnesses:
J. P. Theodore Lang
James Martin Jr.
Inventor:
James Ives
by
Mason, Fenwick & Lawrence

UNITED STATES PATENT OFFICE.

JAMES IVES, OF MOUNT CARMEL, CONNECTICUT.

IMPROVEMENT IN ANNEALING-FURNACES FOR METALS.

Specification forming part of Letters Patent No. 188,143, dated March 6, 1877; application filed November 22, 1876.

*To all whom it may concern:*

Be it known that I, JAMES IVES, of Mount Carmel, in the county of New Haven and State of Connecticut, have invented a new and useful Improvement in Annealing-Furnaces for Metals, which improvement is fully set forth in the following specification, reference being had to the accompanying drawings, in which—

Figure 1:
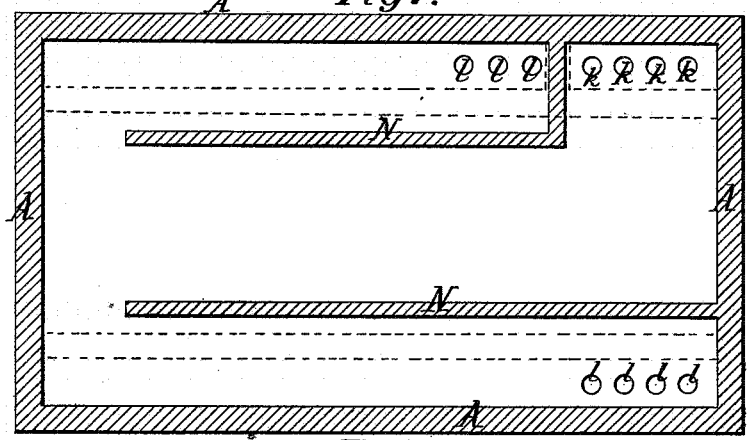
Figure 2:
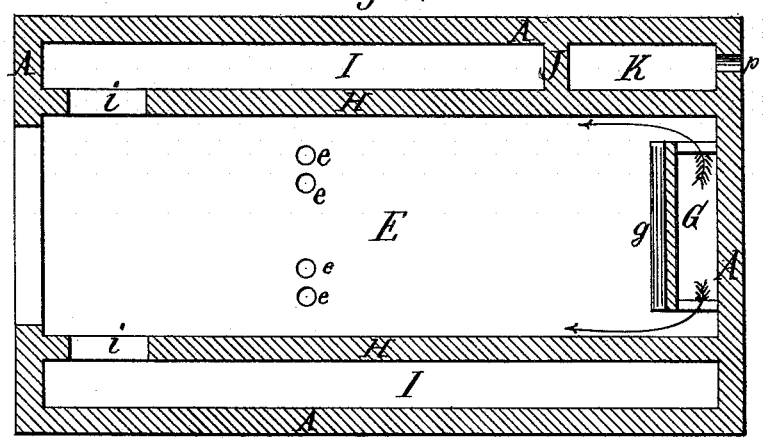
Figure 3:
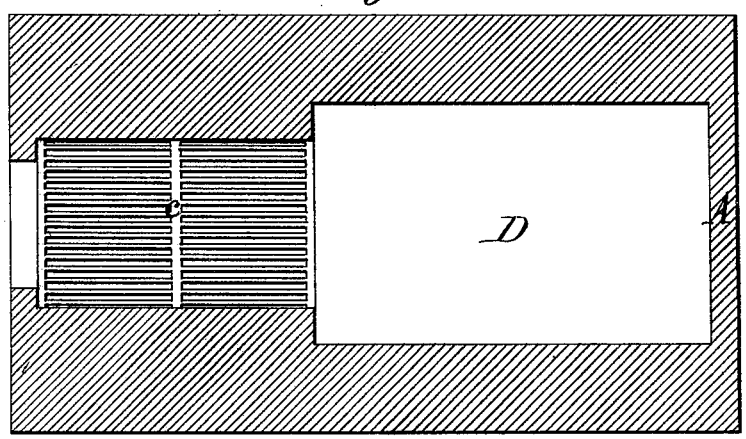

Figure 1 is a horizontal section in the line $x$ $x$ of Fig. 4 of my improved annealing-furnace. Fig. 2 is a horizontal section in the line $y$ $y$ of Fig. 4. Fig. 3 is a horizontal section in the line $z$ $z$ of Fig. 4. Fig. 4 is a vertical longitudinal central section of my improved furnace, a portion of the side wall shown being broken away. Fig. 5 is a diagram of a modification of my improved furnace—the view is a longitudinal section through the center of the furnace. Fig. 6 is a horizontal section of the furnace shown in Fig. 5, exposing the topmost flue and exit-flue. Fig. 7 is a similar section of the furnace shown in Fig. 4, shown united with furnace, Fig. 6, and together forming twin furnaces, with one chimney serving for both.

The nature of my invention consists in certain improvements in the construction, combination, and arrangement of parts of an annealing-furnace, as hereafter fully described and specifically claimed, whereby the furnace is provided with a fire-place and adjacent flue or flues in such a manner that the annealing-oven receives the greatest possible amount of heat from the products of combustion by radiation through its bottom before such products enter the annealing-oven, and come in contact with the crucibles containing the cast-iron to be annealed, and while such radiation of heat, through the bottom of the annealing-oven, is going on the purified gases of the products of combustion enter the annealing-oven in a condition to satisfactorily further the annealing process.

The object of my invention is, first, to avoid the immediate contact of the products of combustion with the annealing apparatus, and the injury to its contents, as in one class of furnaces now used, and without sacrificing a large amount of heat, as in another class of furnaces adopted.

The annealing-furnaces of the present construction are operated, either entirely by radiation in a horizontal direction, or by immediate exposure of the annealing apparatus to the products of combustion; and the first of these two modes of furnace construction has the advantage over the second in that the products of combustion are kept entirely away from the annealing apparatus proper, which is important, as the said products of combustion are highly charged with ingredients, which are very injurious to the annealing process, and the said mode of furnace construction would render the said process perfect if great loss of heat was not experienced, which loss of heat greatly retards the annealing process and increases the expense for fuel.

The second mode of furnace construction, while it gives the requisite heat and avoids loss of fuel, is injurious to the annealing process, as the gaseous impurities of the products of combustion enter the annealing apparatus through its porous walls, and pervade or mingle with the metal inside, and partly decompose it, and otherwise render it unfit for market.

By my invention I have successfully combined the advantages of the above-described furnaces, and avoided the disadvantages of both.

In the drawings, A represents the outer structure or shell of my annealing-furnace, at the bottom of which there is an ash-pit, B. Above the said ash-pit the furnace is provided with a fire-place, C, and grate-bars $c$. The roof E of the fire-place and of the elevated flue D is made of fire-brick of proper thickness with regard to strength and to radiation of heat, and forms the bottom of the annealing-oven F, into which the combustion-gases, after passing through flue D, enter by means of a vertical opening, G, in the rear end of the roof or hearth E. The said opening G is of less width than the annealing-oven proper, and is provided with a shield or guard, $g$, of the same width as the opening, and this shield prevents the pushing of the annealing apparatus over the opening G, and also protects the rear part of the said apparatus against injury from excessive heat; but it does not prevent the circulation of the flame or gases along the immediate upper surface of the hearth E, as illustrated by arrows in Fig. 2. The side walls H of the annealing-oven F form partitions for two lateral flues, I, into which the gases of combustion enter from the annealing-oven through openings $i$, near the front end, said gases being drawn by the draft of the chimney. One of the flues I is subdivided by a vertical partition, J, whereby a rear flue, K, is formed, as seen in Figs. 2, 4, 6, 7. The annealing-oven F, and the lateral flues I, are provided with one common top, L, above which is the top M of the furnace. At the rear of the lateral flues I a number of openings, $l$, afford passages for the combustion-gases through the top L into the chamber above, where they are conducted by means of partitions N toward the front, and then allowed to pass between the said partitions to the rear, and through a number of openings, $k$, into the flue K, whence they enter the chimney P by means of openings $p$.

The said arrangement of the final flue K admits right-and-left furnaces, being constructed and used as a twin-furnace, with one draft-chimney, as shown in Figs. 6 and 7. The advantages of such construction are easily seen by those skilled in the art.

The bottom E of the annealing-oven is provided with passages $e$ near the rear end of the fire-place, which may be closed and opened by means of dampers at the option of the operator, for the purpose of increasing the heat in the oven by means of direct contact of a small portion of the flame or purified gases. The front end of the oven is closed by a door made of iron and lined with fire-brick, which, with the walls and ceilings surrounding the oven, all constructed of fire-brick, form an annealing-furnace, both economical and effective.

Management and operation of the furnace: The furnace described is made as large as can be heated to a uniform temperature throughout — say, fifteen feet long, thirty inches high, and thirty inches wide. The annealing-pots are made of cast-iron, and ten are used in each oven, this number permitting them to be of a size convenient for handling. These pots are made in width and height with respect to the size of the oven, in such a manner that a proper space is left at top, bottom, and sides of the pots, through the whole length of the oven, for the heated air to circulate in. The space under the pots is obtained by narrow bars cast on their bottoms. The pots are filled to their utmost capacity with the iron castings to be annealed, the interstices being filled with oxide-of-iron scales, wet with a solution of sal-ammoniac.

The tops of the pots are then covered with clay, to save the contents from damage by the direct contact of the heat. The ten pots are run into the oven, and placed in a particular order, from back to front end of same, the back pot being set close against the guard $g$, the guard and pot corresponding exactly in height and width, so that the nice point of security from burning and effective annealing may be accomplished as perfectly as possible. All being now ready the front door is closed, and the furnace is charged in the usual way and the fire started. The products of combustion from the fire enter the flue D, wherein the heavy substances carried along by the draft are precipitated.

The gases, now freed from their impurities, enter the annealing-oven through the opening G in a body and completely fill the said oven; and, in connection with the radiating heat from the bottom, heat the annealing apparatus and its contents most thoroughly and uniformly, without depositing any ashes, and without injuring the metal in the annealing apparatus, as before stated.

The gases enter both of the lateral flues I through the holes $i$, and in circulating through said flues increase the heat of the oven by acting upon the outside surface of the partitions H. From the flues I they pass through the holes $l$ into the chamber above the top or ceiling L, around the partitions N through the holes $k$ into the flue K, and thence into the chimney P through the holes $p$, thereby imparting additional heat to the top L of the oven.

The sectional diagram of Fig. 6 shows a modification of my annealing-furnace, in which the lateral flues are omitted, and the combustion-gases pass from the annealing-oven through an opening, $i$, in the top L to the chamber above, and are from there conducted to the chimney in the same manner as above stated. The chamber above the top L may be partly crossed by partitions N, thereby causing the gases to pass to the rear in zigzag line, as shown in Fig. 6; but the said partitions may be omitted, and the gases be allowed to pass directly from the opening $i$ to the openings $k$.

What I claim as new, and desire to secure by Letters Patent, is—

1. An annealing-furnace, consisting, essentially, of a lower fire-grate with longitudinal conveying-flues and an upper hearth or sole on which the annealing-pots are deposited, said hearth having at its rear end a transverse opening and a vertical shield or guard arranged at the edge of said opening, and which is of less length than the width of the bottom of the oven, the several parts being relatively located, as described, whereby the products of combustion from the fire are compelled to traverse the longitudinal flue in direct contact with the hearth-bottom, and thence through its transverse opening into the body of the oven, the vertical guard serving, with the outlet-draft flues, to deflect the course of the gases, and to distribute them over and among the annealing-pots, substantially as and for the purpose herein set forth.

2. In an annealing-furnace, the oven F, having a rear opening, G, and openings $i$ near its front, in combination with side flues I, substantially as set forth.

3. The combination of the fire-chamber C, oven F, side flue I, partition J, passages $l$, flue above the top L of the oven, and passages $k$, substantially as set forth.

4. In an annealing-furnace, the oven F, having openings $e$, in combination with the fireplace C, substantially as set forth.

5. An annealing-oven, the hearth of which is provided with a transverse guard, $g$, and opening G, said guard being about the height of the annealing-pots, and of less width than the oven-hearth, substantially as and for the purpose described.

Witness my hand in the matter of my application for a patent for an improved annealing-furnace, this 20th day of November, 1876.

JAMES IVES.

Witnesses:
   A. C. HALSTED,
   A. B. JACOCKS.